No. 746,195. PATENTED DEC. 8, 1903.
F. L. STORK.
ADJUSTABLE CAN OPENER.
APPLICATION FILED SEPT. 10, 1903.
NO MODEL.
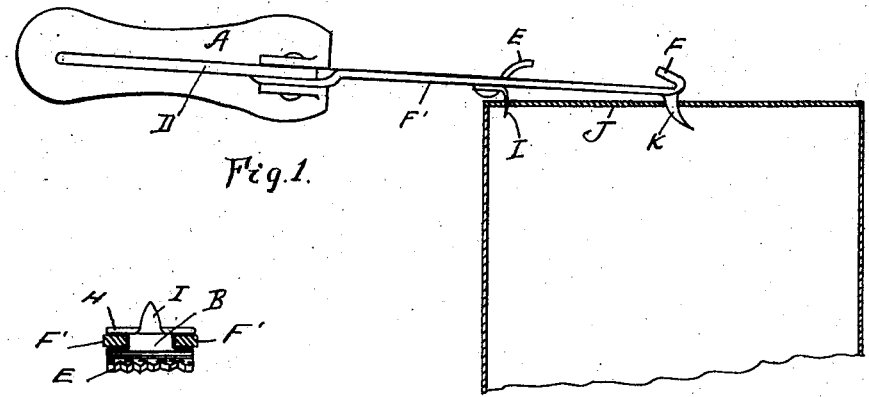
Fig.1.
Fig.3.
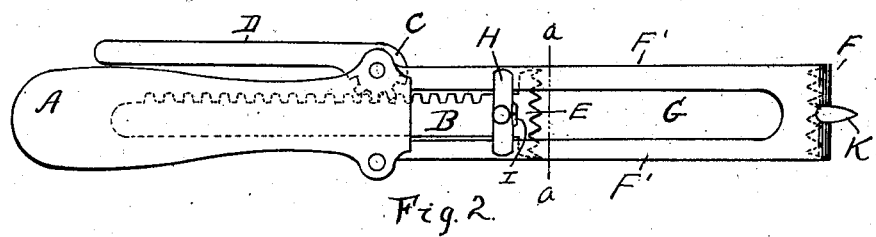
Fig.2.
Witnesses
J. Fred Hemberger.
C. M. Theobald.
F. L. Stork,
Inventor
By R. J. McCarty
his Attorney.

No. 746,195. Patented December 8, 1903.

UNITED STATES PATENT OFFICE.

FREDERICK L. STORK, OF DAYTON, OHIO.

ADJUSTABLE CAN-OPENER.

SPECIFICATION forming part of Letters Patent No. 746,195, dated December 8, 1903.

Application filed September 10, 1903. Serial No. 172,543. (No model.)

*To all whom it may concern:*

Be it known that I, FREDERICK L. STORK, a citizen of the United States, residing at Dayton, in the county of Montgomery and State of Ohio, have invented certain new and useful Improvements in Adjustable Can-Openers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to can-openers; and it consists of an improvement in the implement for unscrewing and removing screw-threaded caps or covers from cans which was patented to myself, No. 736,455, and dated August 18, 1903.

The object of the present improvement is to further extend the utility of the aforesaid implement by adapting it for opening cans other than those which have screw-threaded caps or covers—for example, tomato-cans, &c.

Preceding a detail description of my invention reference is made to the accompanying drawings, of which—

Figure 1 is an illustration of my improved can-opener, showing the same in an operative position upon the head of a can. Fig. 2 is a view at right angles to Fig. 1, showing the implement removed from the can. Fig. 3 is a section on the line *a a* of Fig. 2.

In a detail description of my invention similar reference characters indicate corresponding parts.

A designates the handle, which of course may be of any suitable design. This handle is provided with a longitudinal opening, into and out of which a rack B is movable by means of a segment-gear C, having an extended handle D. The rack B is provided upon its outer end with teeth E, which curve downwardly and are designed in connection with similar teeth F to grip the opposite edges of a screw-threaded cap or cover to remove the same by unscrewing it. The teeth F are on the outer end of the parallel bars F', between which there is a slot G. These bars F' serve as guides for the rack B in its longitudinal movements in and out of the handle A. The toothed end E of the rack extends laterally over the parallel bars F' on one side, and a transverse bar H extends in a similar manner on opposite sides of said bars F', so it will be seen that the rack B is maintained in a sliding connection throughout any part of the parallel bars F'.

The bar H is rigidly attached to the outer end of the rack, and from said bar there extends downwardly a knife I, which is adapted to penetrate the head J of a can in cutting the same. The extreme outer end of the parallel bars is provided with a spur K, which projects downwardly in a direction opposite that of the teeth F. This spur K is adapted to be projected into the head of the can at the center of said head, and thereby serves as a point upon which the implement is turned in a circle when cutting the head of a can by the knife or blade I.

The operation of the implement will be readily understood. The spur or point K is pressed through the center of the head of the can. The handle D is then moved to a position the reverse of that shown in the figures, in which position the segmental gear is out of engagement with the rack. The rack B is then run out to a suitable extent to bring the knife I in a proper position relative to the spur K. The handle D is then drawn backwardly and is gripped by the hand which grips the handle A, and thus the rack is held in a fixed position while the implement is manipulated to cut the edge of the can.

The implement is adapted for any can that has to be cut in order to open the same—such, for example, as cans with soldered, cemented, or otherwise permanently attached heads.

Having described my invention, I claim—

An adjustable can-opener consisting of a handle having an opening therein, parallel bars F' with intervening space, said bars being rigidly connected to the handle and terminating at their outer ends in one piece with a projecting spur K thereon, a rack movable between said parallel bars, a transverse bar H connected to the outer end of said rack, said bar having a knife I projecting therefrom, and a segment-gear pivoted to the handle and engaging with said rack, said gear having an extended handle by which it is operated, substantially as set forth.

In testimony whereof I affix my signature presence of two witnesses.

FREDERICK L. STORK.

Witnesses:
R. J. McCarty,
Carolyn M. Theobald.